INVENTOR.
HARRY C. McCURDY
BY Schmieding and Fultz
ATTORNEYS

INVENTOR.
HARRY C. McCURDY
BY
Schmieding and Fultz
ATTORNEYS

Aug. 23, 1960 H. C. McCURDY 2,949,893

TRACER MECHANISM

Filed Aug. 2, 1957 8 Sheets-Sheet 3

INVENTOR.
HARRY C. McCURDY
BY Schmieding and Fultz
ATTORNEYS

Aug. 23, 1960 H. C. McCURDY 2,949,893

TRACER MECHANISM

Filed Aug. 2, 1957 8 Sheets-Sheet 4

INVENTOR.
HARRY C. McCURDY
BY
Schmieding and Fultz
ATTORNEYS

INVENTOR.
HARRY C. McCURDY
BY Schmieding and Fultz
ATTORNEYS

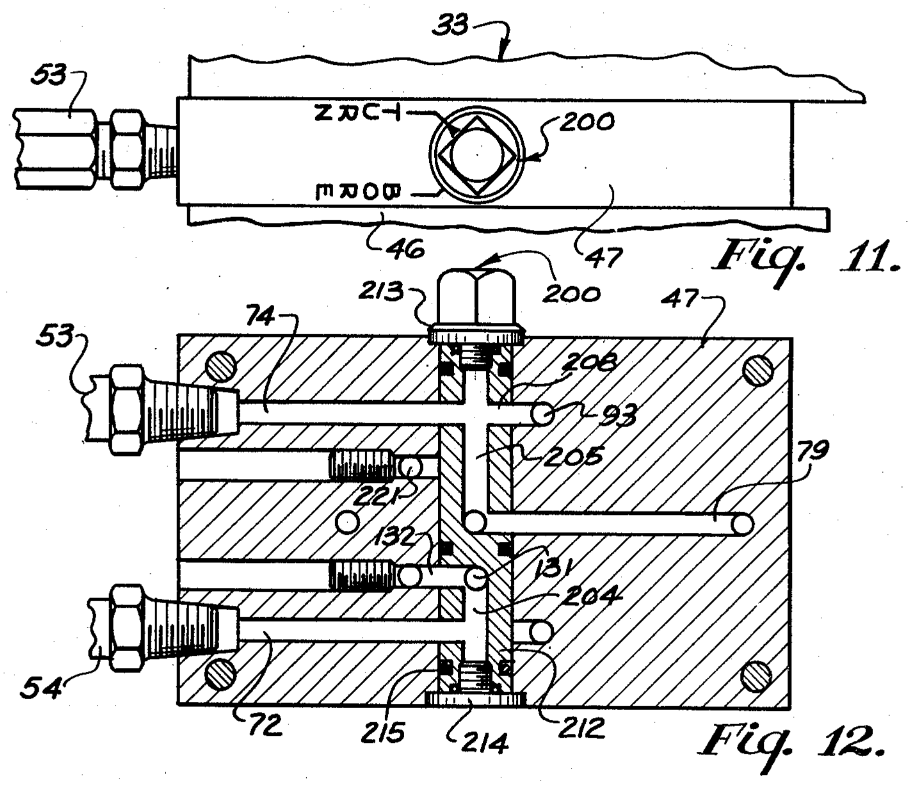
FIG. 11, FIG. 12
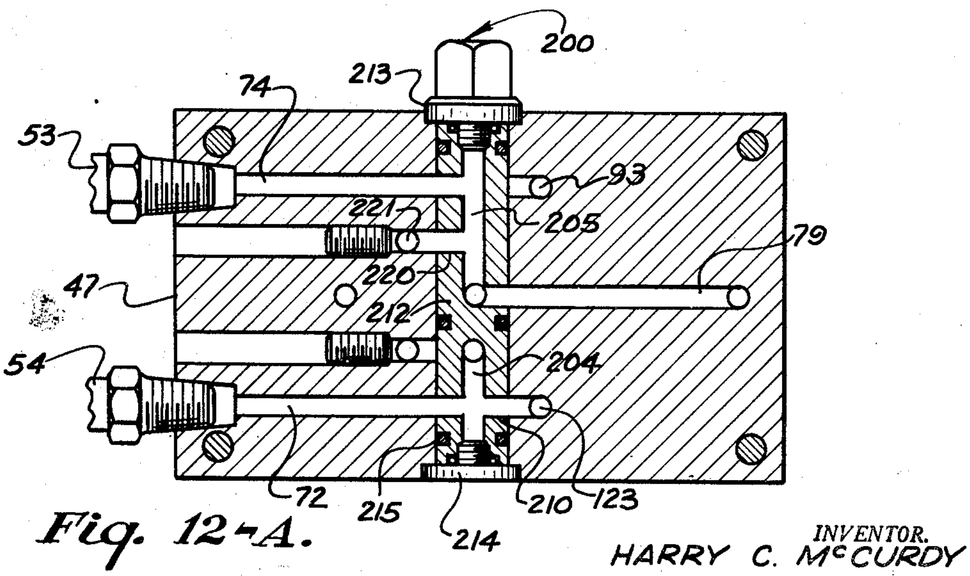
Fig. 12-A.
INVENTOR.
HARRY C. McCURDY
BY Schmieding and Fultz
ATTORNEYS INVENTOR.
HARRY C. McCURDY
BY
Schmieding and Fultz
ATTORNEYS INVENTOR.
HARRY C. McCURDY
BY
Schmieding and Fultz
ATTORNEYS United States Patent Office 2,949,893
Patented Aug. 23, 1960

2,949,893

TRACER MECHANISM

Harry C. McCurdy, Zanesville, Ohio, assignor to The R. K. Le Blond Machine Tool Company, Cincinnati, Ohio, a corporation of Delaware Filed Aug. 2, 1957, Ser. No. 675,954

10 Claims. (Cl. 121—45)

This invention relates to tracer mechanisms for establishing the path of a tool in conformity with the shape of a template, and particularly to an improved hydraulic control apparatus for such mechanisms.

In general, the tracer mechanism of the present invention is applicable to machine tools, such as lathes, wherein a work piece is shaped by means of a cutting tool and relative movement must be effected between the tool and work piece in accordance with a specific pattern in order to form the work piece to a desired shape. Such machine tools generally include a carriage which is moved along a path adjacent the work piece and the carriage supports a tool holder and tool that are moveable towards and away from the work piece. The mechanism of the present invention includes a fluid motor and associated control apparatus that are mounted on the carriage of the machine tool. The fluid motor is operatively connected to the tool holder for moving same relative to the carriage and work piece and the control apparatus includes contour detection means, such as a stylus in engagement with a template, and serves to control the fluid energy input to the fluid motor whereby the desired path for the cutting tool is dictated by such control apparatus in conformity with the contour sensed by the contour detecting means.

More particularly, the control apparatus for the tracer mechanism incorporates a simplified and novel valve means provided by a valve cylinder containing a normally centered spool that is shiftable in two directions from a centered position. When the spool is in the centered position it serves to prevent the flow of pressurized fluid from a source, such as a pump, to the fluid motor that advances the cutting tool. The spool and associated valve cylinder are constructed so that only a minute displacement of the spool in one direction from center institutes delivery of pressurized fluid to the fluid motor and so that only a minute displacement of the spool in the other direction from center drains fluid from the fluid motor. When such displacement of the spool occurs movement of the cutting tool commences and such movement is caused to occur responsive to even very minute changes in contour being sensed by the contour sensing means. Moreover, only a minute displacement of the spool back to the centered position cuts off the delivery of fluid energy to the fluid motor whereby movement of the cutting tool is caused to cease responsive to very minute changes in contour being sensed by the contour sensing means.

The present invention relates to a novel reversing mechanism whereby the above described control apparatus can be utilized for forming both external and internal contours on work pieces. Such reversing mechanism is provided by a multiple port valve plate mounted between the previously mentioned fluid motor and control apparatus. With this arrangement it is only necessary to actuate a controller in the valve plate between "Turn" and "Bore" positions in order to change the direction of operation of the control apparatus.

As another aspect of the present invention, a novel stylus and template construction is incorporated in the above described control apparatus to provide a tracer mechanism adapted to accurately reproduce contours in accordance with a line scribed into a template surface as contrasted with conventional apparatus that reproduce contours in accordance with the contoured edge of a template.

It is therefore an object of the present invention to provide a tracer mechanism of the type described which incorporates a control apparatus provided with an improved reversing mechanism of simplified construction that achieves versatile and precise performance with a minimum of component parts.

It is another object of the present invention to provide a tracer mechanism of the type described which mechanism incorporates an improved control apparatus that is readily reversible in operation whereby both external and internal contours can be reproduced with a single mechanism by use of a single template for both boring and turning.

It is another object of the present invention to provide a tracer mechanism of the type described that is not only adapted for conducting both boring and turning operations, but also provides the additional advantage that when a boring operation is being conducted the boring tool is retracted or moved rearwardly which is the normal direction of movement of a boring tool on a lathe when a boring operation is being conducted without a tracer mechanism.

It is still another object of the present invention to provide a tracer mechanism of the type described that is adapted to reproduce contours in accordance with a line scribed into the surface of a template thus eliminating the need for relatively expensive templates having contoured edges.

Further objects and advantages of the present invention will be apparent from the following description, reference being had to the accompanying drawings wherein a preferred form of embodiment of the invention is clearly shown.

In the drawing:

Figure 11 is a top view showing a valve plate reversing mechanism for the control apparatus of the present invention;

Figures 9, 10:
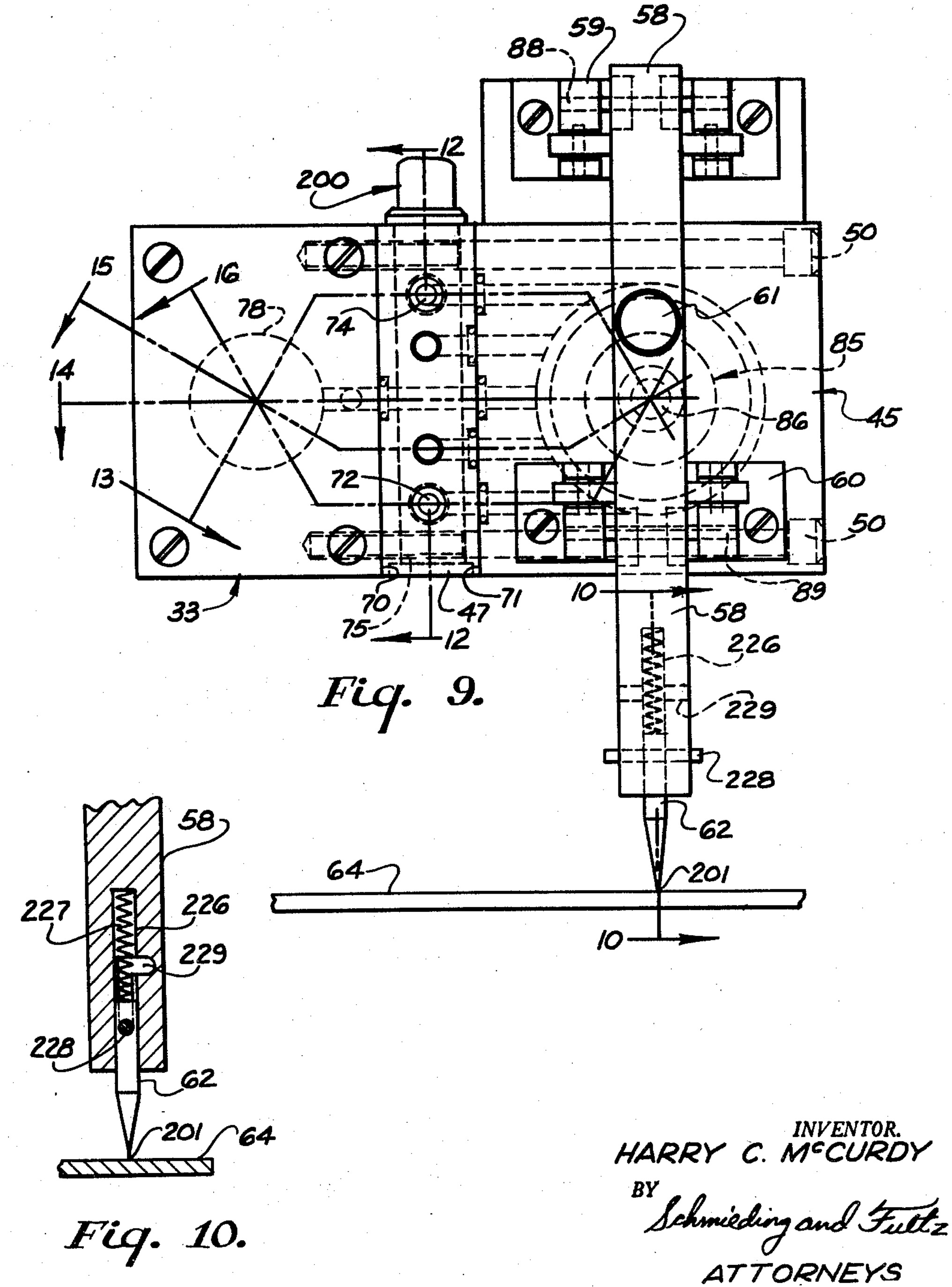
Figure 9 is a rear view of the fluid motor and control apparatus of the preceding figures showing the locations of the cutting planes for the sectional views of Figures 13 through 16.
Figure 10 is a sectional view showing the interior details of the stylus of the present invention, the section being taken along the line 10—10 of Figure 9.
Figure 13:
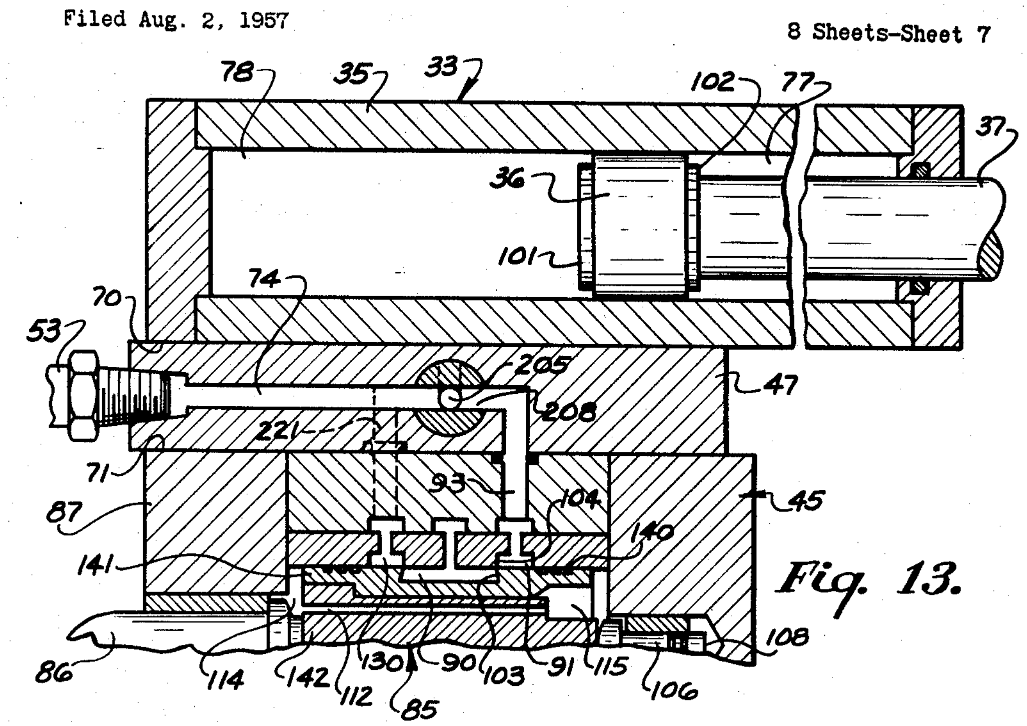
Figure 14:
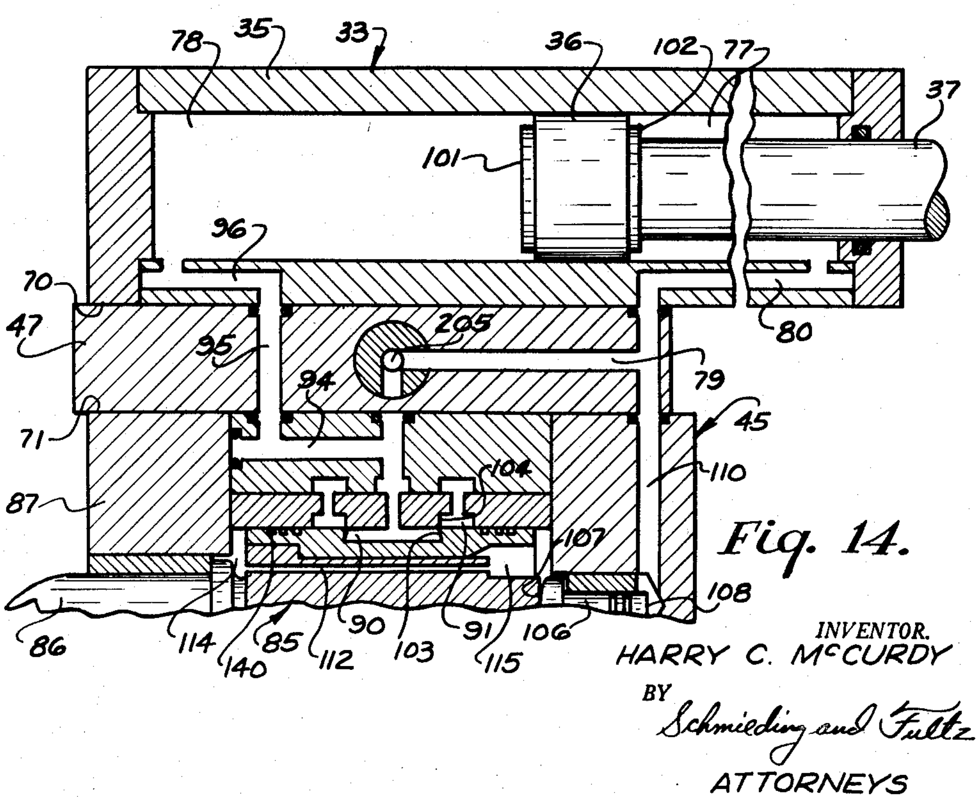
Figure 15:
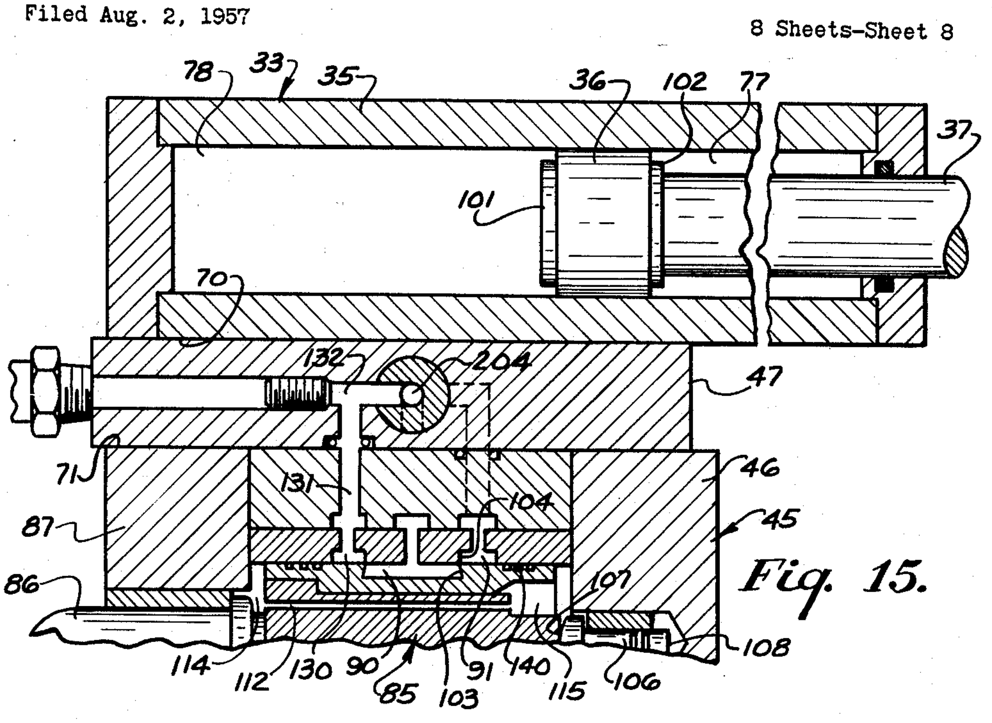
Figure 16:
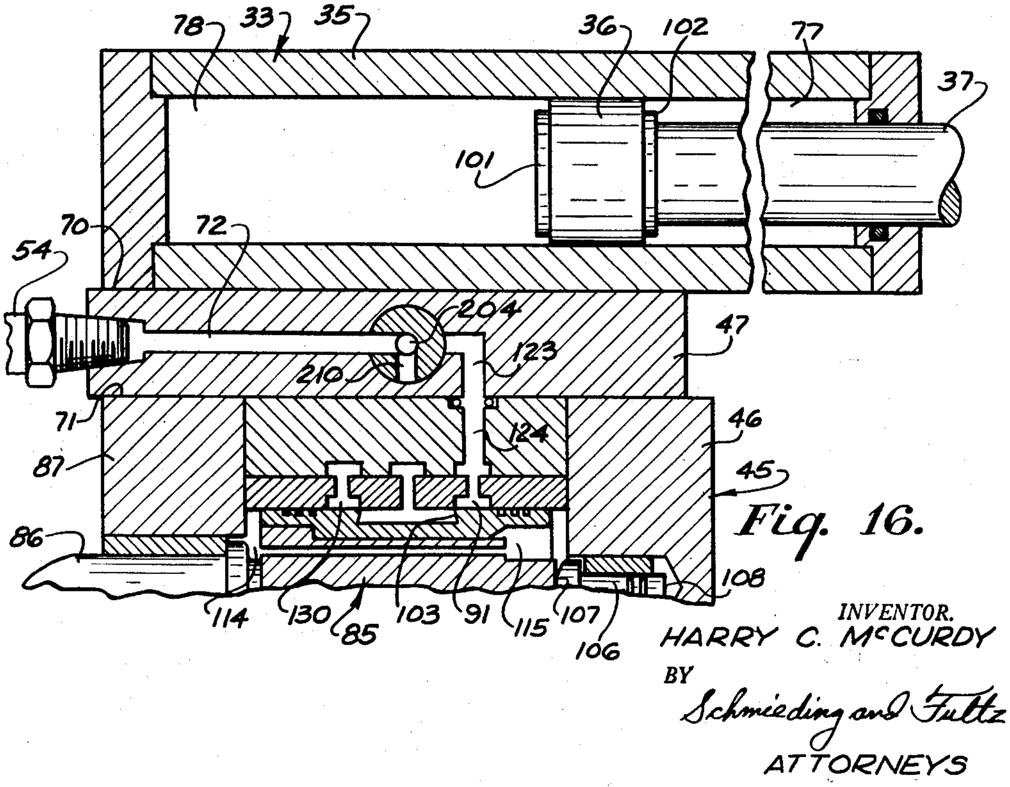

Figures 12 and 12–A are sectional views of the valve plate reversing mechanism of Figure 11, the sections being taken along the line 12—12 of Figure 9;

Figure 13 is a top sectional view of the fluid motor and control apparatus of the preceding figures, the section being taken along the line 13—13 of Figure 9 so as to show certain fluid passage connections between said fluid motor and control apparatus;

Figure 14 is a second top sectional view of the apparatus of Figure 13, the section being taken along the line 14—14 of Figure 9 so as to show certain other fluid passage connections between the fluid motor and control apparatus;

Figure 15 is a third top sectional view of the apparatus of Figure 13, the section being taken along the line 15—15 of Figure 9 so as to show still other fluid passage connections between the fluid motor and control apparatus; and Figure 16 is a fourth sectional view of the apparatus of Figure 13, the section being taken along the line 16—16 of Figure 9.

Figure 1:
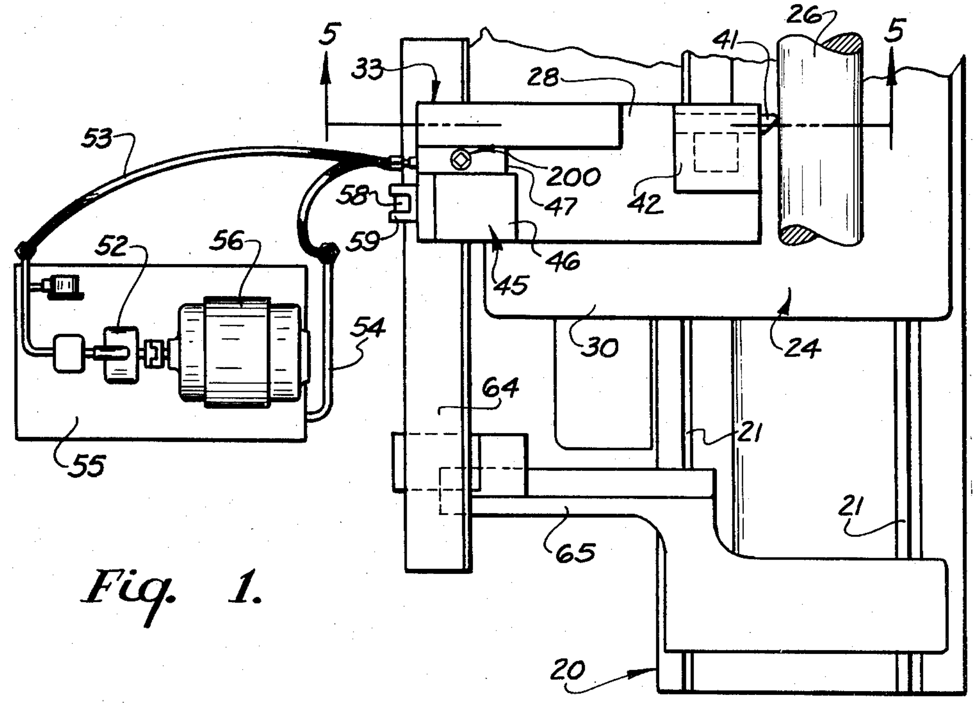
Figure 1 is a partial plan view of a lathe showing the tracer mechanism of the present invention applied thereto.
Figure 2:
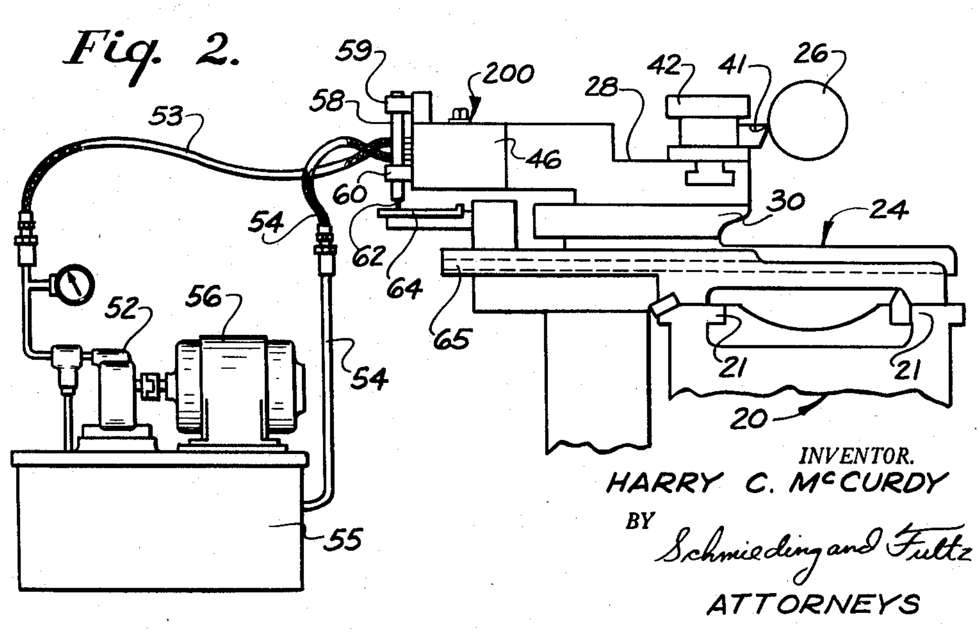
Figure 2 is a partial side elevational view of the lathe of Figure 1 showing the tracer mechanism of the present invention applied thereto.

Referring in detail to the drawing, Figures 1 and 2 illustrate a lathe, indicated generally at 20, comprising ways 21 forming tracks for a carriage indicated generally at 24. The lathe 20 also includes a conventional head and tail stock, not illustrated, for rotatably supporting a work piece such as rod 26.

Referring again to Figures 1 and 2, upper carriage portion 28 carries a control apparatus, indicated generally at 45, that includes a valve body 46 and a valve plate 47. The control apparatus 45 is attached to the side of fluid motor 33 by a plurality of screws 50 best seen in Figures 7 and 9. In general, control apparatus 45 serves to control the flow of fluid from a pump 52 via a line 53 to fluid motor 33 and also the flow of fluid from fluid motor 33 via a line 54 to a reservoir 55. A motor 56 is connected to pump 52 for driving same. The specific operation of control apparatus 45 is described in detail later herein.

Referring to Figures 1, 2, 7, and 8, valve body 46 carries a stylus 58 pivoted at either an upper pivot mount 59 or a lower pivot mount 60. The lower end of stylus 58 includes a pointed tip 62 that is inserted into guided relationship in a groove formed by a scribed line 201 on the top surface of template 64 mounted on a template carrier 65 which is in turn mounted on the bed of the lathe. When carriage 24 moves along ways 21 pointed tip 62 of stylus 58 is moved along scribed line 201 on template 64 whereby the change in contour of the scribed line 201 is sensed by the stylus. By appropriate mechanism, later to be described in detail, control apparatus 45 transduces the change in contour signal sensed by stylus 58 into the precise flow control of fluid delivered to or released from fluid motor 33 whereby upper carriage portion 28 is retracted or advanced relative to lower carriage portion 30 as is required to reproduce the contour of template 64 on work piece 26.

Figure 7:
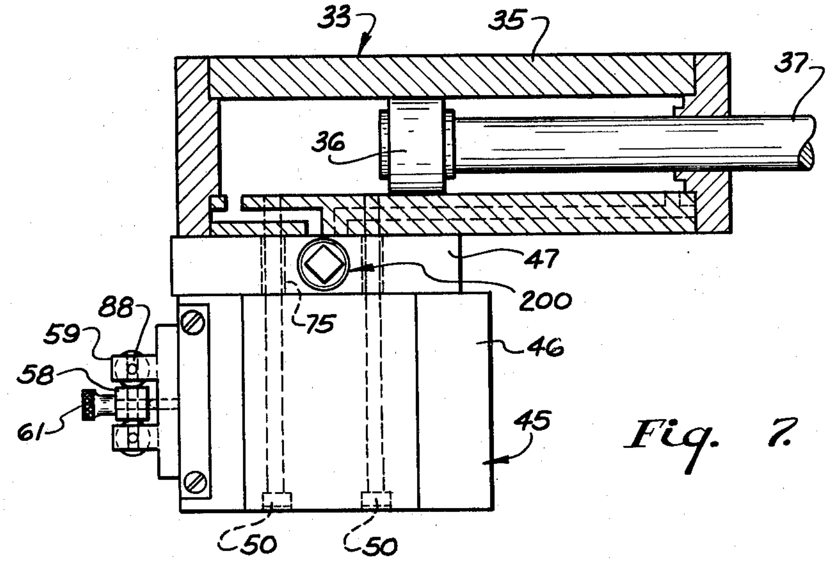
Figure 7 is a top view partially in section, of a fluid motor and control apparatus comprising a portion of the tracer mechanism of the preceding figures, the section being taken along the line 14—14 of Figure 9.
Figure 8:
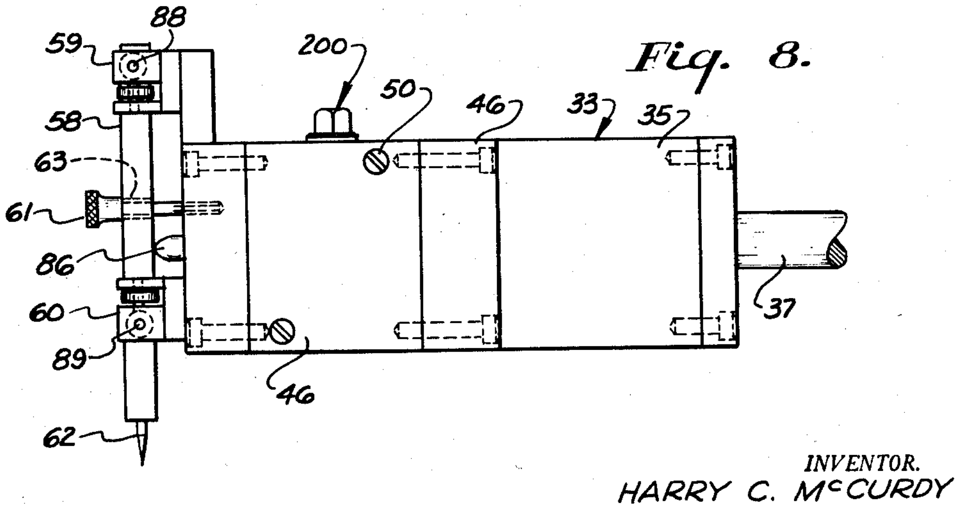
Figure 8 is a side view of the fluid motor and control apparatus of Figure 7.

As is best seen in Figures 7 and 8, stylus 58 is provided with a guide pin 61 extended through a hole 63 in the stylus and mounted in a threaded hole in valve body 46.

With particular reference to Figures 9, 11, 12, and 13–16 the operation of the mechanism in turning exterior contours will next be described in detail. Valve plate 47 includes a spool indicated generally at 200 that consists of a body portion 212 rotatable in valve plate 47. An upper cap portion 213 and a lower cap portion 214 removably secure body portion 212 to valve plate 47. A plurality of resilient seals 215 are provided on the body portion to isolate the various passages one from the other. Valve plate 47 includes a longitudinal pressurized passage 74, Figures 9, 12, and 13, that communicates with line 53 from pump 52, and also a longitudinal drain passage 72, Figures 9, 12 and 16, that communicates with reservoir 55 via line 54, Figure 2.

In conducting a turning operation spool 200 is positioned in the "Turn" position illustrated in Figures 11 and 12. With particular reference to Figures 13 and 14, it should be pointed out that the rod end or front of piston 36 and also chamber 77 are always pressurized from longitudinal pressurized passage 74 via passages 205, 79 and 80. When fluid is added to chamber 78 the differential in areas between the front or rod end 102 and the rear end 101 of piston 36 causes retraction of cylinder 35 and upper carriage portion 28 relative to stationary piston 36 and lower carriage portion 30.

The addition or release of fluid to or from chamber 78 is accomplished by means of a balanced spool indicated generally at 85, Figures 13 through 16 wherein spool 85 is illustrated in its center position. Spool 85 is shifted to the right by means of a plunger 86 slidably carried in the left end plate 87 of valve body 46. As is best seen in Figures 7 and 8, the outer end of plunger 86 is engaged by stylus 58. In conducting a turning operation, Figure 4, an upper pivot pin 88, Figure 8, is removed from upper pivot mount 59 and a lower pivot pin 89 is retained in place. When the stylus tip 62 is moved rearwardly, Figure 4, by pressure from template 64, plunger 86 is moved inwardly whereby spool 85 is moved to the right as viewed in Figures 13 through 16. When spool 85 is moved to the right an annular groove or neck 90 in the spool communicates with annular passage 91 in the valve body whereby fluid enters neck 90 via pressurized passage 74 in valve plate 47, spool passage 203 in spool 200, and passage 91 in valve body 46 as seen in Figure 13. The added fluid then enters chamber 78 of the fluid motor via passage 94 in the valve body, passage 95 in the valve plate and passage 96 in the fluid motor as seen in Figure 14. As cylinder 35 moves to the left, as viewed in Figures 13 through 16, fluid will be expelled from chamber 77 at the rod end of piston 36 via passages 80, 79 and 205, Figures 14 and 12, whereby such expelled fluid is returned to pressurized passage 74. It will be understood that although both chambers 77 and 78 are pressurized, when spool 85 is moved to the right, cylinder 35 will be moved to the left or retracted relative to piston 36 due to the differential in area between the rear end 101 and the front or rod end 102 of piston 36.

It will be noted from Figures 13 through 16 that when spool 85 is in a centered position and fluid motor 33 is inoperative, only a very minute movement of piston 85 is required to place neck 90 in communication with annular passage 91 due to the fact that a right edge 103 of spool 85 lies only a minute distance to the left of a left edge 104 of annular passage 91 when the spool is centered. Hence only a very minute change in contour on template 64, Figure 4, will connect neck 90 with annular passage 91 whereby fluid motor 33 is energized and tool 41 is retracted. It will be understood that the extreme sensitivity of control apparatus 45 and the precision in contour duplication achieved by the mechanism is result from the minute distance separating edge 103 on the spool from edge 104 on the valve body. Very precise operation has been achieved where the minute distance between edges 103 and 104 when the spool is centered has a dimension of seven tenths of a thousandth of an inch.

As is best seen in Figure 14, spool 85 is constantly urged to the left by a hydraulic biasing mechanism provided by a relatively small piston 106 slideably carried in the right end of valve body 46. The left end 107 of small piston 106 engages the right end of spool 85 and the right end 108 of small piston 106 is exposed to pressurized fluid from a passage 110 in valve body 46 which passage communicates with longitudinal pressurized passage 74 in valve plate 47. It will be noted that right end surface 108 of small piston 106 is of relatively small area whereby the force exerted by small piston 106 on spool 85 is of a very low magnitude. Hence only a very small force need be exerted on stylus 58 by template 64 in order to effect shifting of spool 85 and energization of fluid motor 33. It has been found that very sensitive and satisfactory operation of the mechanism results when the area of small piston 106 is established, for the particular fluid pressure being applied, so as to bias spool 85 to the left by a force that can be overcome by the application of about ten ounces of force on stylus 58.

Figure 4:
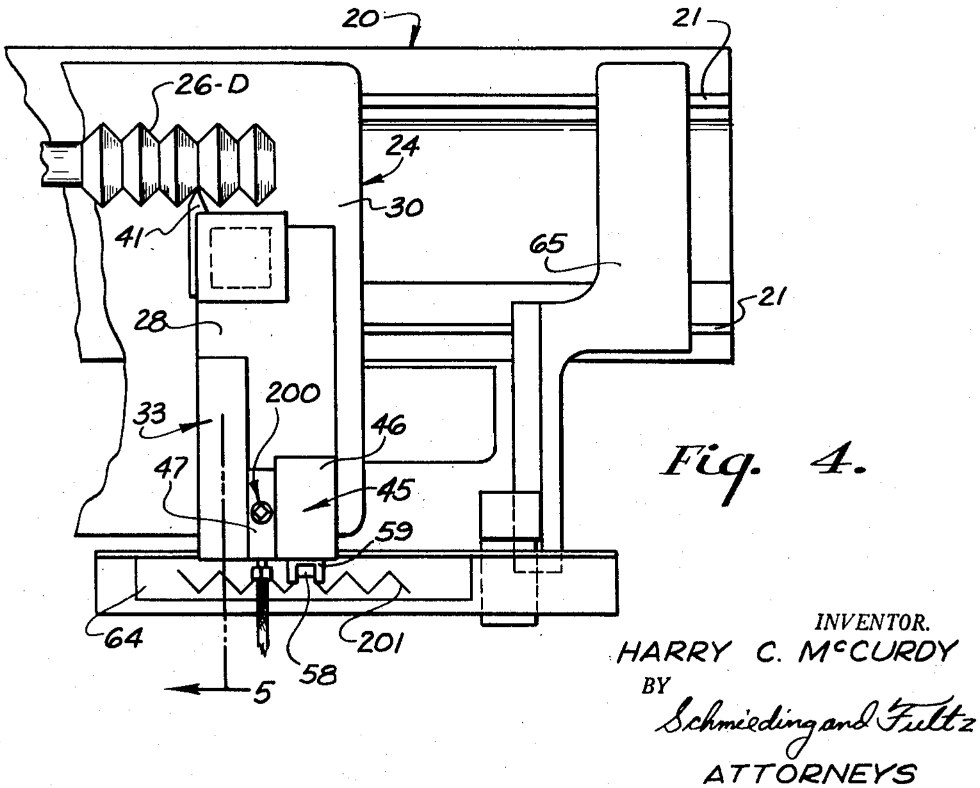
Figure 4 is a plan view of the lathe of the preceding figures showing the tracer mechanism of the present invention set up for reproducing an external contour as required for a turning operation.
Figure 6:
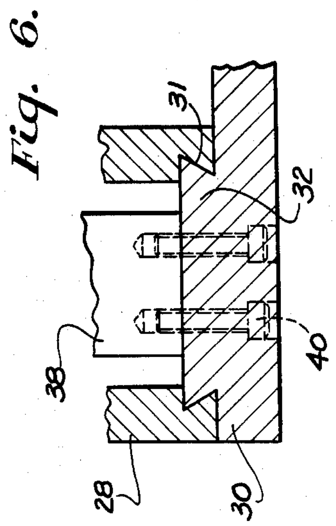
Figure 6 is a partial rear sectional view of the carriage of Figure 5 with the section being taken along the line 6—6 of Figure 5.
Figure 5:
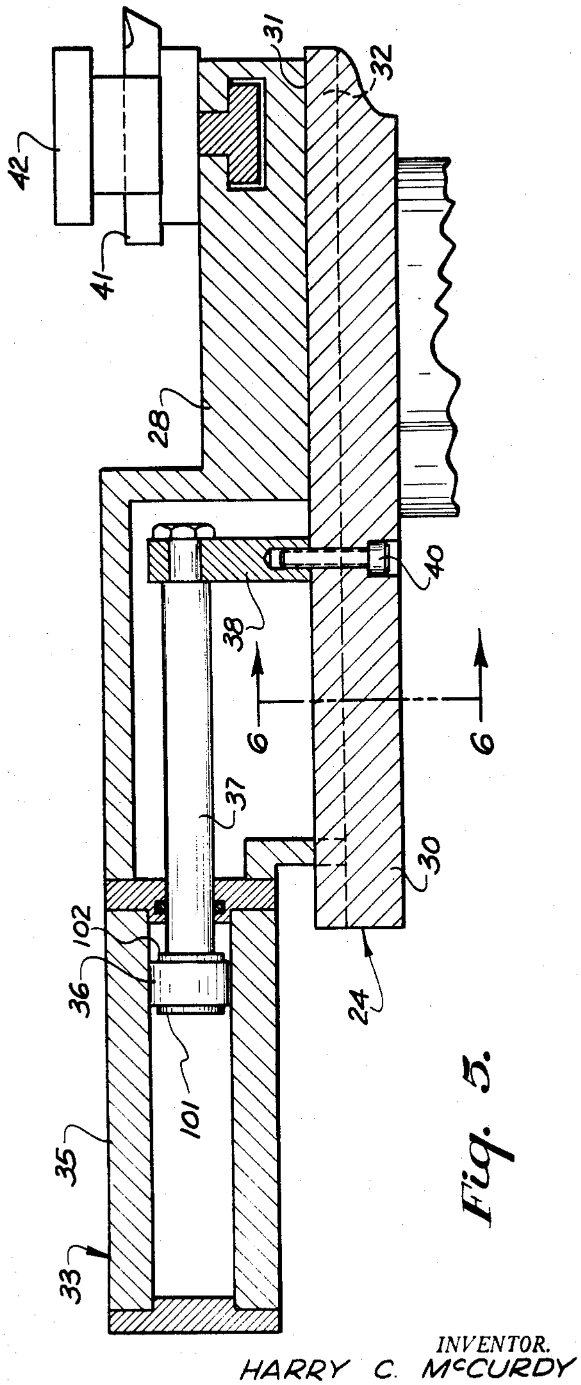
Figure 5 is a side sectional view showing the carriage of the lathe of Figures 1 through 4 and the fluid motor of the apparatus of the present invention, the section being taken along the line 5—5 of Figure 4.

In conducting a turning operation with the set up of Figure 4, when the lower end 62 of stylus 58 moves forwardly with the stylus being pivoted on lower pivot pin 89, Figure 8, stylus 58 will cease to exert a force on plunger 86. The above described hydraulic bias provided by small piston 106, shifts spool 85 to the left whereby the annular chamber provided by neck 90 is placed in communication with drain passage 72 via an annular passage 130, passages 131 and 204 in the valve body and passage 132 in valve plate 47. See Figures 9 and 15. Hence chamber 78 of the fluid motor is placed in communication with reservoir 55 via passages 96, 95, 94, and neck 90, Figure 14, and annular passage 130, passages 131 and 204, Figure 15, and passage 72, Figure 12. When chamber 78 of fluid motor 33 is placed in communication with reservoir 55, upon shifting of spool 85 to the left, upper carriage portion 28 and tool 41 are retracted.

It will be understood that spool 85 need be shifted only a very minute distance to the left in order to establish communication between neck 90 and the annular passage 130 leading to reservoir 55. For example, the previously mentioned dimension of seven tenths of a thousandth of an inch has been found to provide very precise operation. Hence the same sensitivity is achieved in extending upper carriage portion 28 as is achieved in retracting upper carriage portion 28 as previously described. It will now be understood that when spool 85 is in the centered position illustrated, pressurized neck 90 is delicately balanced in a precise centered position between the edge of a pressurized annular passage 91 communicating with pump 52 and the edge of a low pressure annular passage 130 leading to reservoir 55.

With reference to Figure 13 through 16, spool 85 is hydraulically balanced by means of small passages 112 that extend through the body of the spool. Hence in the event that pressurized fluid should leak from pressurized annular chamber 90 to either a left chamber 114 or a right chamber 115 such chambers communicate with one another via passages 112 whereby the delicate balance of the spool is not disturbed and the hydraulic bias applied to the spool is not varied.

Figure 3:
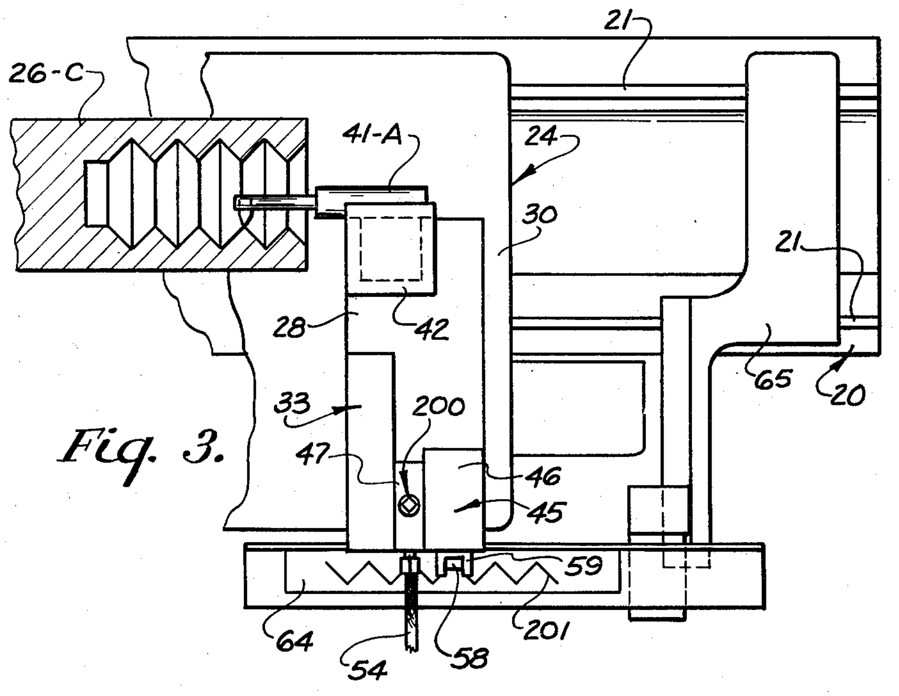
Figure 3 is a plan view of the lathe of the preceding figures showing the tracer mechanism of the present invention set up for reproducing an internal contour as required for a boring operation.

Referring next to the disposition of the control apparatus 45 for a boring operation, such as is illustrated in Figure 3, a template is retained in the same configuration relative to stylus 58 and lower pivot pin 89, Figure 8, is removed from lower pivot mount 60 whereby stylus 58 pivots on upper pivot pin 88. To effect advancing of boring tool 41–A it is necessary to drain fluid from chamber 78, Figures 13 through 16, and maintain chamber 77 pressurized whereby cylinder 35 of fluid motor 33 is advanced relative to piston 36 which, as previously decribed, is maintained stationary relative to lower carriage portion 30. In order to adapt control apparatus 45 to drain chamber 78 it is only necessary to rotate spool 200 to the "Bore" position, marked on the top of valve plate 47 as seen in Figure 11, which rotation of spool 200 turns spool passage 208, Figure 13, out of alignment with passages 74 and 93 whereby chamber 78 is isolated from pressure passage 74. Rotation of spool 200 to the "Bore" position also places annular chamber 91 in communication with drain passage 72 via passage 123 in the valve plate and passage 124 in the valve body as will be understood from consideration of Figures 12–A and 15 since spool passage 210 will be aligned with passage 123 in the valve plate. Hence annular chamber 91 can drain to reservoir via passages 124, 123, 210, 204, and 72. Hence it will be understood that with spool 200 in the "Bore" position, movement of spool 85 to the right of the center position illustrated serves to drain chamber 78 to reservoir 55 via passages 96, 95, 94, and neck 91, Figure 14, and annular chamber 91, passages 124, 123, 210 and 72, Figure 16.

With reference to Figures 12–A and 14, it will be understood that when spool 200 is in the "Bore" position chamber 77 is maintained pressurized via passages 205 and 79 that connect passage 80 in the fluid motor with longitudinal pressurized passage 74 in valve plate 47.

In operations of the control apparatus 45 of Figures 11 through 14 in conducting a boring operation, with spool 200 in the "Bore" position, forward movement of stylus 58, Figure 3, by template 64–A moves plunger 86 inwardly whereby spool 85 is shifted to the right against the bias force of small piston 106, said piston being pressurized via passages 205 and 79 in valve plate 47 that connect longitudinal pressurized passage 74 in the valve plate with passage 110 in the valve body as seen in Figures 12–A and 14. When spool 85 is moved a minute distance to the right of the center position, chamber 78 of the fluid motor is placed in communication with reservoir 55 via passages 96, 95, 94 and neck 90, Figure 14, and by passages 91, 124, 123, 210, 204, and 72, Figures 16 and 12–A. When chamber 78 is placed in communication with reservoir 55, upon shifting of spool 85 to the right of center, chamber 77 of the fluid motor is maintained pressurized, as previously described, whereby the differential in pressure between chambers 77 and 78 extends cylinder 33 and upper carriage 28 forwardly and boring tool 41–A is extended relative to work piece 26–C.

When spool 85 is shifted to the left, however, with spool 200 in the "Bore" position of Figure 12–A, chamber 78 is pressurized via pump 52, passages 74, 205, 220, 221, annular passage 130, neck 90, Figures 12–A and 13, and passages 94, 95, 96, Figure 14. At the same time, chamber 77 is maintained pressurized via passages 74, 205, 79, and 80, Figures 12–A and 14, and, due to the differential in area between ends 101 and 102 of piston 36, cylinder 35, upper carriage portion 28 and boring tool 41 are retracted relative to work piece 26–C. Hence it will be understood that with the boring set up of Figure 3, control apparatus 45 serves to both extend and retract boring tool 41–A as required to duplicate the contour of a template such as 64.

With reference to Figures 13 through 16, the outer surface of spool 85 is provided with a plurality of small annular grooves 140 which serve to hydraulically balance spool 85 with respect to radially inwardly directed pressures exerted on the outer surface of the spool by fluid that leaks between the confronting surfaces of the spool and spool cylinder. It will be understood that if recesses 140 were not present the leakage of high pressure fluid into the space between the confronting surfaces of the spool and cylinder would not be uniformly distributed about the circumference of the spool whereby the spool would bind in the cylinder. When recesses 140 are provided, however, the leakage pattern becomes uniform about the circumference of spool 85 when recesses 140 fill up with high pressure fluid and the spool will then slide on rings of high pressure fluid formed by the pressurized fluid entrapped in recesses 140.

As seen in Figures 13 through 16, spool 85 is of a novel composite construction consisting of an outer cylindrical shell 141 formed of high speed steel or other long wearing metal and a core 142 formed of aluminum or other light weight metal. Such composite construction results in an extremely light spool of low inertia that can be very easily and rapidly shifted by a relatively light force exerted by the stylus or the previously described opposing hydraulic bias. In practice it has been found that spools weighing six ounces give extremely sensitive response to even minute changes in template contour.

As another important advantage of the present novel construction of spool 85 and its arrangement in the valve apparatus, no packing is utilized between the outer surface of spool 85 and the confronting surface of the spool cylinder whereby frictional resistance between the spool and spool cylinder is maintained at a minimum. Such low frictional resistance together with the lightness achieved by the composite spool construction and the hydraulic balance provided by passages 112 and recesses 140 combine to virtually eliminate resistance to spool movement whereby the extreme sensitivity of the mechanism is achieved.

Another important advantage of the present control apparatus resides in the fact that it is adapted for low pressure operation, i.e. the fluid pressure supplied by pump 52 need only be 150–250 p.s.i. as compared to 500 p.s.i. generally required for the operation of tracer mechanisms. As a result of such low pressures the control apparatus 45 operates at room temperature, whereby critical dimensions, such as the distance between recess edges 103 of the spool and edges 104 of the annular grooves 91 and 130 are not varied by thermally imposed expansion and contraction of the elements of the apparatus. With reference to Figures 13 through 16, the low pressure and hence low temperature operation of the apparatus is inherent in the novel design of the apparatus in that unrestricted flow can be achieved without the presence of any structural limitations on the volumetric flow potential. Specifically, the chamber formed by neck 90 of spool 85 can quickly receive and discharge relatively large volumetric flow rates from or to the relatively large annular recesses 91 or 130 on either side of neck 90. It will be understood that only a slight lateral shifting of spool 85 to the right or left of center quickly exposes a relatively large annular connection between neck 90 and annular recess 91 or 130 with such annular communication being continuous around the entire circumference of edges 103 and 104.

Reference is next made to Figures 9 and 10 which illustrate the novel stylus and template apparatus of the present invention. The body of stylus 58 includes a hole 226 that slideably mounts the pointed tip 62. A compression spring 227 constantly urges tip 62 downwardly into the minute groove formed by scribed line 201 in the upper surface of template 64. Tip 62 carries transverse pin 228 that latches in groove 229 upon lifting and rotating of tip 62 whereby tip 62 is retained in an upper position out of contact with template 64. It has been found that with the extremely sensitive control mechanism of the present invention a scribed line forming a groove of approximately one thirty-second of an inch deep is adequate to cause stylus 58 to follow the contour of the scribed line.

While the form of embodiment of the present invention as herein disclosed constitutes a preferred form, it is to be understood that other forms might be adopted, all coming within the scope of the claims which follow.

I claim:

1. A control apparatus for establishing the path of a tool moving along the ways of a lathe, said apparatus comprising, in combination, means forming a source of pressurized fluid; means forming a reservoir; a fluid motor including a side wall having a plurality of ports; valve means including a valve body having a side wall provided with a plurality of ports and a movable flow control element movable from a first position to a second position or from said first position to a third position; spool housing means including a first side wall confronting said side wall of said fluid motor and a plurality of ports communicating with said ports of said fluid motor and a second side wall confronting said side wall of said valve means and a plurality of ports communicating with said ports of said valve means; a spool movably mounted in said spool housing means, said spool including a first position wherein movement of said flow control element from said first position to said second position connects a certain port of said fluid motor to said source and a certain other port of said fluid motor to said reservoir, and said spool including a second position wherein movement of said flow control element from said first position to said third position connects said certain port of said fluid motor to said source and said certain other port of said fluid motor to said reservoir; a lever operatively connected to said flow control element for movement of said element from said first position to one of said second and third positions; and means forming a chamber communicating with said source, an end of said control element being exposed to pressurized fluid in said chamber for urging said flow control element towards the other of said second and third positions.

2. A control apparatus for establishing the path of a tool moving along the ways of a lathe, said apparatus comprising, in combination, means forming a source of pressurized fluid; means forming a reservoir; a fluid motor including a side wall having a plurality of ports; valve means including a valve body having a side wall provided with a plurality of ports and a movable flow control element movable from a first position to a second position or from said first position to a third position; spool housing means including a first side wall confronting said side wall of said fluid motor and a plurality of ports communicating with said ports of said fluid motor and a second side wall confronting said side wall of said valve means and a plurality of ports communicating with said ports of said fluid motor and a second side wall confronting said side wall of said valve means and a plurality of ports communicating with said ports of said valve means; a spool movably mounted in said spool housing means, said spool including a first position wherein movement of said flow control element from said first position to said second position connects a certain port of said fluid motor to said source and a certain other port of said fluid motor to said reservoir, and said spool including a second position wherein movement of said flow control element from said first position to said third position connects said certain port of said fluid motor to said source and said certain other port of said fluid motor to said reservoir; a lever operatively connected to said flow control element for movement of said element from said first position to one of said second and third positions; and hydraulically actuated means for urging said flow control element towards the other of said second and third positions.

3. A control apparatus for establishing the path of a tool comprising, in combination, a valve body including a side wall and an inner cylindrical surface provided with two spaced recesses having spaced inner edges; means forming a source of pressurized fluid communicating with one of said recesses; means forming a drain communicating with the other of said recesses; a control element having an outer surface slideably engaging said cylindrical surface and provided with a recess having two outer edges each of which is spaced a minute distance inwardly from a respective one of said inner edges of said valve body recesses; a fluid motor including a side wall; passage means connecting said fluid motor with said valve body; sensing means operatively connected to said control element for moving said element in one direction; hydraulically actuated means for moving said control element in the other direction; spool housing means mounted between said side walls and including first and second conduits connecting with said two spaced recesses; and spool means movably mounted in said spool housing means and including a plurality of passages for reversing the connections of said source and drain with said first and second conduits connecting with said spaced recesses.

4. Mechanism defined in claim 3 characterized by said control element being formed as a spool having longitudinal passage means connecting opposite ends of a chamber formed by said inner cylindrical surface.

5. Mechanism defined in claim 3 characterized by said control element being formed as a spool including an outer shell formed of relatively heavy material and an inner core formed of relatively light weight material.

6. Mechanism defined in claim 3 characterized by said control element being formed as a spool including a circumferentially extending recess located between one of said edges and an end of said spool.

7. A control apparatus for establishing the path of a tool comprising, in combination, a valve body including an inner cylindrical surface provided with two spaced recesses having spaced inner edges; a fluid motor; means forming a source of pressurized fluid; means forming a reservoir; a first passage means connecting said source with one of said recesses; a second passage means connecting said reservoir with the other of said recesses; reversing valve housing means interposed between said valve body and said fluid motor for interchanging said first and second passage means connections whereby said source communicates with said other recess and said reservoir communicates with said one recess, said reversing valve housing means including a rotatable valve element having two longitudinal passage means aligned with the axis of rotation of said element and a plurality of transverse passage means communicating with said longitudinal passage means; a control element having an outer surface slideably engaging said cylindrical surface and provided with a recess having two outer edges each of which is spaced a minute distance inwardly from a respective one of said inner edges of said valve body recesses; passage means connecting said fluid motor with said valve body; sensing means operatively connected to said control element for moving said element in one direction; and means forming a chamber communicating with said source, an end of said control element being exposed to pressurized fluid in said chamber for moving said control element in the other direction.

8. A control apparatus for establishing the path of a tool comprising, in combination, a valve body including an inner cylindrical surface provided with two spaced recesses having spaced inner edges; a fluid motor; means forming a source of pressurized fluid; means forming a drain; a control element having an outer surface slideably engaging said cylindrical surface and provided with a recess having two outer edges each of which is spaced a minute distance inwardly from a respective one of said inner edges of said valve body recesses; passage means connecting said fluid motor with said valve body; reversing valve housing means interposed between said valve body and said fluid motor, said housing means including rotatable spool means provided with a plurality of conduits; a first passage connecting one of said recesses with said housing means; a second pasage connecting the other of said recesses with said housing means; a third passage connecting said source with said housing means; a fourth passage connecting said drain with said housing means, said spool means including a first position wherein said plurality of conduits connect said first and third passages and said second and fourth passages and a second position wherein said plurality of passages connect said first and fourth passages and said second and third passages; a lever having first and second detachable pivotal mountings, said lever being operatively connected to said movable control element; and hydraulically actuated means for moving said control element in the other direction.

9. A control apparatus for establishing the path of a tool comprising, in combination, a valve body including an inner cylindrical surface provided with two spaced recesses having spaced inner edges; means forming a source of pressurized fluid communicating with one of said recesses; means forming a drain communicating with the other of said recesses; a control element having an outer surface slideably engaging said cylindrical surface and provided with a recess having two outer edges each of which is spaced a minute distance inwardly from a respective one of said inner edges of said valve body recesses; a fluid motor; passage means connecting said fluid motor with said valve body; a lever having first and second detachable pivotal mountings, said lever being operatively connected to said movable control element; spool housing means mounted between said valve body and fluid motor and including first and second conduits connecting with said two spaced recesses; spool means movably mounted in said spool housing means and including a plurality of passages for reversing the connections of said source and drain with said first and second conduits connecting with said spaced recesses; and hydraulically actuated means for moving said control element in the other direction.

10. A control apparatus for establishing the path of a tool comprising, in combination, a valve body including an inner cylindrical surface provided with two spaced recesses having spaced inner edges; means forming a source of pressurized fluid communicating with one of said recesses; means forming a drain communicating with the other of said recesses; a control element having an outer surface slideably engaging said cylindrical surface and provided with a recess having two outer edges each of which is spaced a minute distance inwardly from a respective one of said inner edges of said valve body recesses; a fluid motor; passage means connecting said fluid motor with said valve body; reversing valve housing means interposed between said valve body and said fluid motor, said housing means including rotatable spool means provided with a plurality of conduits; a first passage connecting one of said recesses with said housing means; a second passage connecting the other of said recesses with said housing means; a third passage connecting said source with said housing means; a fourth passage connecting said drain with said housing means, said spool means including a first position wherein said plurality of conduits connect said first and third passages and said second and fourth passages and a second position wherein said plurality of passages connect said first and fourth passages and said second and third passages; a lever having first and second detachable pivotal mountings, said lever being operatively connected to said movable control element, said lever including a body portion and an end movably mounted on said body portion; means for retaining said end in a lower position relative to said body portion; means for retaining said end in an upper position relative to said body portion; and hydraulically actuated means for moving said control element in the other direction.

References Cited in the file of this patent

UNITED STATES PATENTS

| | | |
|---|---|---|
| 297,454 | Schwitter | Apr. 22, 1884 |
| 684,971 | Barr | Oct. 22, 1901 |
| 2,255,698 | Cooke | Sept. 9, 1941 |
| 2,313,849 | Turchan | Mar. 16, 1943 |
| 2,331,443 | Von Zelewsky | Oct. 12, 1943 |
| 2,359,704 | Woody | Oct. 3, 1944 |
| 2,374,714 | Turchan | May 1, 1945 |
| 2,486,097 | Barnes | Oct. 25, 1949 |
| 2,601,157 | Le Lan | June 17, 1952 |
| 2,618,244 | Roehm | Nov. 18, 1952 |
| 2,655,904 | Strayer | Oct. 20, 1953 |
| 2,671,432 | Bruet | Mar. 9, 1954 |
| 2,706,426 | Kelley | Apr. 19, 1955 |
| 2,733,642 | Beatty | Feb. 7, 1956 |